Figure 1:
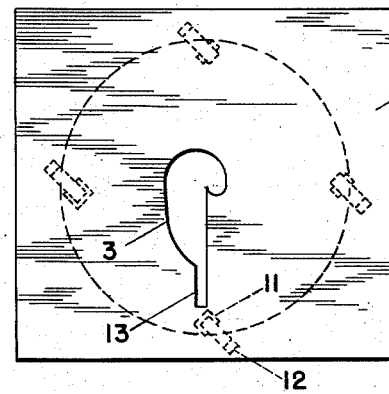

Oct. 10, 1950     J. GADSBY ET AL     2,525,664
CASTING OF PHOTOPOLYMERIZABLE COMPOSITIONS

Filed Dec. 6, 1948     2 Sheets-Sheet 1

Inventors
JOHN GADSBY
ALAN LESLIE LAWS TOMPSETT

Cushman, Darby & Cushman
Attorneys

Oct. 10, 1950  J. GADSBY ET AL  2,525,664
CASTING OF PHOTOPOLYMERIZABLE COMPOSITIONS
Filed Dec. 6, 1948  2 Sheets-Sheet 2

Inventors
JOHN GADSBY
ALAN LESLIE LAWS TOMPSETT

Cushman, Darby & Cushman
Attorneys

Patented Oct. 10, 1950

2,525,664

UNITED STATES PATENT OFFICE 2,525,664

CASTING OF PHOTOPOLYMERIZABLE COMPOSITIONS

John Gadsby, Welwyn, and Alan Leslie Laws Tompsett, London, England, assignors to Imperial Chemical Industries Limited, a corporation of Great Britain Application December 6, 1948, Serial No. 63,802
In Great Britain December 10, 1947

6 Claims. (Cl. 18—58)

1

This invention relates to an improved process for the casting of plastic structures consisting essentially of transparent polymeric materials, and more particularly, it is concerned with improved methods for the photocatalytic polymerisation of polymerisable materials to form plastic optical elements, especially lenses and mirrors.

Although it is well known that certain unsaturated organic compounds can be converted to resinous materials by photopolymerisation, the application of this principle to the casting of articles suitable for use as optical elements has been attended by serious difficulty because as photopolymerisation proceeds to the stage at which a solid resin forms, small voids and internal strains often make their appearance and persist in the fully polymerised product, detracting considerably from the utility of the product. In copending appliction of Alan White, Serial No. 764,735, filed July 30, 1947, there is described a new concept of photopolymerisation which now allows plastic structures to be produced without the concurrent formation of small voids or internal strains. This new contribution, which makes possible the casting of precision optical elements, briefly involves the controlling of the amount of light falling upon a polymerisable mass during light-catalysed polymerisation thereof so that the amount of light is varied across the irradiated area of the polymerising mass, i. e. the catalysing light is not permitted to shine directly from the external light source in equal quantities upon the entire irradiated area. According to the process described in this White application, the control of light irradiation is preferably accomplished by placing a screen having properly positioned opaque areas between the source of light used for catalysing the polymerisation reaction and the irradiated surface of the polymerising mass so as to cut off or diminish the amount of light that falls upon certain areas.

The present application covers improvements in the general procedure described briefly above and covered in the copending application.

It is an object of the present invention to provide an improved process for the production of optical elements. It is a further object to provide an improved process for the production of optical elements constituting a volume of revolu-

2 tion composed essentially of transparent polymeric materials by the polymerisation of polymerisable materials in suitable moulds whereby said elements are obtained in a substantially bubble free and strain free state. Other objects will appear hereinafter.

These objects are accomplished according to the present invention by a process which comprises subjecting a liquid polymerisable composition comprising a photopolymerisable monomeric compound possessing at least one $>C=C<$ group in the molecule to the polymerising action of light in a mould having internal surfaces conforming to the shape of the desired element, i. e. a volume of revolution, until a solid body is formed, and controlling the light so that the average quantity of light per unit thickness (measured in the direction of the incident light) falling per unit time upon a unit area of said liquid composition decreases in a non-linear manner as the distance from the axis of revolution increases up to the outer edge of the optical elements. Preferably, the light is decreased exponentially, although it is possible to have the decrease become less rapid, other than exponentially, as the distance from the axis of reference increases or to have the decrease become more rapid as the distance from the reference axis decreases.

Comparing the brief description of the present invention as given immediately above with the description of the novel procedure contributed by White in his indicated copending application, it will be seen that the present invention provides improvements in the manner in which the light used to conduct the photopolymerisation is varied during the photopolymerisation reaction. In other words, the present applicants have discovered that improved results in the general process of screen-controlled-light polymerisations can be obtained if the quantity of light per unit thickness is caused to decrease in a non-linear manner, particularly exponentially, from the central axis of the structure being formed outwardly toward the edge of the structure.

It will be obvious that the mold surface through which said monomeric compound or partial polymer is illuminated must be substantially transparent to light. For this reason glass moulds are customarily employed. Suitable jigs are necessary to hold any two portions of a mould so that they are correctly disposed to each other.

Any convenient method may be selected for obtaining the control of the light falling upon the polymerisable material in the process of the present invention. Preferably, the process of the invention is operated using an apparatus comprising a source of light, a screen as hereinafter described, and a mold shaped for the casting of a lens or other optical element, confining a volume of revolution, the source of light being positioned on the axis of reference and the screen interposed between the source of light and the mould, and the mould and screen being capable of continuous relative rotary movement. The screen comprises either a disc of opaque material, from which a suitable shape sector has been removed, or a disc of opaque material in which a sector has been rendered transparent or a transparent disc which has been rendered opaque except in a suitably shaped sector. The disc can, and normally will, form part of a sheet of material, the extent and shape of the sheet outside the disc being, of course, a matter of no importance in the present invention. If desired, the disc can be characterised by the presence of more than one sector.

For simplicity of construction and calculation of said sector a source of light on the axis of reference is normally used. The said disc or sheet comprising the disc is mounted between the light source and the mould, so that its centre is on the axis of reference of the mould, the disc or sheet comprising the disc lying in a plane normal to the axis of reference. Either the mould or screen is provided with means of rotation about the axis of reference so that continuous relatively rotary movement can be maintained between the screen and the mould for the duration of polymerisation.

Normally the mould is rotated, for example, on a turntable, and the screen held stationary. This obviates the necessity of designing a mounting and driving mechanism for the screen which does not interfere with the required distribution of light falling upon the mould.

A more complete understanding of the procedures of the present invention may be had by reference to the accompanying drawings which illustrate a preferred form of apparatus for use in the process of this invention.

Figure 2:
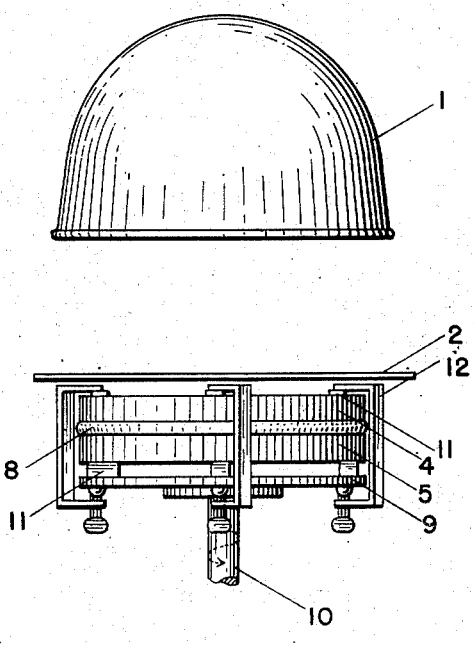

In the drawings,

Figure 1 is a plan view of the apparatus, and
Figure 2 is a side elevation of the apparatus.

Referring in detail to the drawings, 1 is a parabolic reflector containing an electric lamp. 2 is an opaque screen having an accurately shaped sector 3 removed to provide suitable orifice for the passage of light in accordance with the requirements hereinbefore described. 4 and 5 are upper and lower halves of the casting mould. 8 is a gasket inserted between the two halves of the mould. 9 is a turntable. 10 is the turntable spindle. 11 are packing blocks and pads to enable circulation of cooling air between lower half of mould and turntable. 12 are G clamps.

The shape of the sector is designed to allow for the polymerisation of the flash which exists between the mould surfaces, external to the optical element. The position of the sector which serves this purpose is designated in Figure 1 by the numeral 13.

To define the control of light irradiation, in accordance with this invention more explicitly than has been done in the general description above, if Q is the average quantity of light per unit time falling on a unit area of the element, $t$ is the thickness of the element measured in the direction of the incident light and $x$ is the distance from the axis of revolution measured in the centre of the element, then throughout the range of $x=o$ to $x=r$, where $r$ is the radius of the element, $$\frac{d}{dx}\left(\frac{Q}{t}\right)$$

is a negative for all values of $x$, and $$\frac{d^2}{dx^2}\left(\frac{Q}{t}\right)$$

is not zero throughout this range. If the rays of light are not parallel or symmetrical about the axis of reference, there will be various values of $t$ for each value of $x$ and in these cases, we mean by $t$, the average value of $t$.

The said light preferably falls upon the polymerisable material in a direction substantially parallel to said axis of reference. Since it is desirable that the illumination at any point shall be as constant as possible it is preferred that the value of Q be related to a unit of time as small as possible, for example, per minute or per second. It is not usually related to a period greater than an hour since irregularities in the intensity of light permitted by a unit period of greater length frequently results in lack of homogeneity in the product obtained by our process.

This invention is concerned with the control of the polymerisation until the liquid polymerisable material is substantially completely converted to the solid state. Within the range of reaction rates to which the process is normally limited in practice by the considerations that the polymerisation should proceed sufficiently fast for the process to be economically operated but not so fast that there is sufficient heat generated to lead to thermal activated polymerisation and loss of control, we find that the intensity of the incident light and the thickness of the section exert substantially similar but opposite influences upon the polymerisation time, so that changes in the thickness $t$ may be compensated by proportional changes in the amount of light Q. We prefer that the value of $Q/t$ decreases from the axis of reference to the edge of the optical element so that at the edge of the optical element it is not less than one-twentieth of its value at the axis of reference. The overall rate at which the intensity of light per unit thickness of the element decreases from the axis of reference may increase as the distance from the axis of reference increases, i. e. the curve when $$\frac{Q}{t}$$

is plotted against $x$ may be convex uppermost with, if desired $$\frac{d^2}{dx^2}\left(\frac{Q}{t}\right)$$

zero or even positive for some values of $x$. In these circumstances, we normally prefer that $$\frac{d^2}{dx^2}\left(\frac{Q}{t}\right)$$

is small for all values of $x$. The overall rate at which the intensity of light per unit thickness of the element decreases from the axis of reference may also decrease as the distance from the axis of reference increases, i. e. the curve when $$\frac{Q}{t}$$

is plotted against $x$ may be concave uppermost with, if desired, $$\frac{d^2}{dx^2}\left(\frac{Q}{t}\right)$$

zero or even positive for some values of $x$. We find that the process of this invention may be completed particularly quickly to obtain specified freedoms from strain when the light is decreased exponentially, i. e. when $$\frac{Q}{t}=ke^{-Ax}$$

where $k$ is a constant which is, for economic reasons, as large as is consistent with control of the process, i. e. as large as is possible without the heat generated by the process resulting in thermal polymerisation and loss of control, and, also for economy reasons, we normally work with the smallest value of A, another arbitrary constant, to result in an optical element having an adequate degree of freedom from strain. From the previously stated considerations we prefer that $$0 < A < \frac{1}{r}\log_e 20$$

In practice, however, we obtain our precise value for A empirically, i. e. we carry out the process using a particular value for A and, if the optical element produced is not sufficiently free from strain for its particular application, we repeat the trial with a larger value for A, or, if the optical element produced is sufficiently free from strain and we consider that the process would be completed satisfactorily more rapidly, we repeat the trial with a smaller value for A.

However, as indicated above, it is possible to operate the process successfully other than with exponential decrease in the light and, more broadly, this decrease can be made to become less rapid in any general manner as the distance from the axis of reference increases, i. e. so that $$\frac{d}{dx}\left(\frac{Q}{t}\right)$$

is negative for all values of $x$, and, although $$\frac{d^2}{dx^2}\left(\frac{Q}{t}\right)$$

may be zero for some values of $x$ or even negative, the curve, when $$\frac{Q}{t}$$

is plotted against $x$, is one which is concave uppermost.

On the other hand, the decrease in light can be controlled so that it becomes more rapid as the distance from the axis of reference increases, i. e. so that $$\frac{d}{dx}\left(\frac{Q}{t}\right)$$

is negative for all values of $x$, and, although $$\frac{d^2}{dx^2}\left(\frac{Q}{t}\right)$$

may be zero for some values of $x$ or even positive, the curve, when $$\frac{Q}{t}$$

is plotted against $x$ is one which is convex uppermost.

Since it is preferred that the value of Q be related to a unit of time as small as possible, and this value will not usually relate to a period greater than an hour, when our preferred method of operation is used a rate of revolution of the mould or screen of the order of 0.1–100 revs./minute is preferred.

When $$\frac{Q}{t}=ke^{-Ax}$$

the discussed screen sector covers all parts of the disc when, using conventional polar coordinates, $$0 \leq \theta \leq k^1 t\, e^{-Ax}$$

taking the centre of the disc as the origin and any radius of the disc as the $x$ axis and the value of $k^1$ being an arbitrary constant such that, for all values of $x$, $\theta$ is less than 360° and A, $t$ and $x$ having the values hereinbefore assigned. When $$\frac{Q}{t} \neq ke^{-Ax}$$

it is convenient either to calculate the shape of the sector assuming that $$\frac{Q}{t}=ke^{-Ax}$$

or $$\frac{Q}{t}=k^x(1-Ax)$$

the shape of the sector being then set out, using polar coordinates, by the equation $$0 \leq \theta \leq k''t(1-Ax)$$

and then modifying the shape of the sector.

The following calculations give sectors suitable for casting a 254 mm. radius of curvature, 50.8 mm. semi-diameter double convex lens, using parallel light controlled in such a way that $$\frac{Q}{t}=ke^{-Ax}$$

The thickness of the lens at a point distant $x$ from the axis of reference is given by $$t_x = n + 2\sqrt{(254)^2 - x^2} - 2\sqrt{(254)^2 - (50.8)^2}$$

where $n$ is the thickness of the flash surrounding the lens. In this example $n=2.54$ mm., hence $$t_x = 2\sqrt{64516 - x^2} - 495.2$$

In Table I below will be found, in columns 1 and 2 respectively, values of $x$ from 0 to 50.8 and the calculated values of $t_x$. Column 3 gives the corresponding values of $e^{-Ax}$: A has a value of 0.03 mm.$^{-1}$, chosen so that the value of $Q/t$ is about 5 times greater at the centre of the component than at the edge. Column 4 gives the value of the angle $\theta$ obtained by multiplying the product of $t_x$ and $e^{-Ax}$ by a further arbitrary constant $k'$ chosen in this instance so that the maximum value of $\theta$, when $x=0$ is 360°. The value of $k'$ in this example is 28.1.

The values of $x$ from 50.8 to 100 are plotted to permit the polymerization of a flash round the component. Between these values $t$ is constant and equals 2.54 mms.

Many more values of $x$ and $t$ are plotted than are shown in the table, to give greater accuracy.

A further set of values is shown in Table II. Here the value of $k$ is 0.005 mm.$^{-1}$ giving a smaller ratio of $Q/t$ between the centre and edge of the component (1.3 instead of 5), and the value of $k'$ has been adjusted to make the maximum value of $\theta$ 180°, which is equivalent to halving the intensity of the light supplied.

Table I

| $x(m)$ | $t(m)$ | $e^{-Ax}$ | $\theta(=kt\ e^{-Ax})$ |
|---|---|---|---|
| 0 | 12.80 | 1.00 | 360 |
| 10 | 12.40 | 0.74 | 258 |
| 20 | 11.22 | 0.55 | 173 |
| 30 | 9.24 | 0.41 | 106 |
| 40 | 6.48 | 0.30 | 55 |
| 50.8 | 2.54 | 0.22 | 16 |
| 100 | 2.54 | 0.05 | 4 |

Table II

| $x(m)$ | $t(m)$ | $e^{-Ax}$ | $\theta(=k't\ e^{-Ax})$ |
|---|---|---|---|
| 0 | 12.80 | 1.00 | 180 |
| 10 | 12.40 | 0.95 | 166 |
| 20 | 11.22 | 0.91 | 143 |
| 30 | 9.24 | 0.86 | 112 |
| 40 | 6.48 | 0.82 | 75 |
| 50.8 | 2.54 | 0.78 | 28 |
| 100 | 2.54 | 0.61 | 22 |

Another illustration is provided by considering the control of the polymerisation of a plane concave lens of radius of curvature 120 mm. and semi-diameter 60 mm. having a centre thickness of 5 mm. In making the convex mould for a component of this type it is convenient to continue the curve beyond the edge of the component rather than to have an abrupt change of form to give a definite flash. The figures are therefore given up to a value of $x$ of 90 mm., that portion of the element for which $x$ exceeds 60 being regarded as flash. In this example, the average intensity of the incident light is controlled in such a way that the value of $$\frac{Q}{t}$$

diminishes as the square of the distance from the axis of reference, i. e.

$$\frac{Q}{t} = kt_x(1-Ax^2)$$

with a value for $A$ of $10^{-4}$ mm.$^{-2}$.

The thickness of the lens at a point distant $x$ from the axis of reference is given by $$t_x = m + 120 - \sqrt{(120)^2 - x^2}$$

where $m$ is the thickness at the centre. In the example $m = 5$ mm. Hence $$t_x = 125 - \sqrt{14,400 - x^2}$$

In Table III will be found in columns 1 and 2 respectively values of $x$ from 0 to 90 and the calculated values of $t_x$. Columns 3 gives the value of $(1-Ax^2)$, $A$ having the magnitude given above, and in column 4 is the value of the angle $\theta$ obtained by multiplying the product of $t_x$ and $(1-Ax^2)$ by a further arbitrary constant $(k'')$ chosen so that $\theta$ max 270°. The value of $k''$ in this example is 19.2.

Table III

| $x$ | $t_x$ | $(1-Ax^2)$ | $\theta$ |
|---|---|---|---|
| 0 | 5.00 | 1.00 | 96 |
| 10 | 5.42 | 0.99 | 103 |
| 20 | 6.68 | 0.96 | 123 |
| 30 | 8.81 | 0.91 | 154 |
| 40 | 11.86 | 0.84 | 192 |
| 50 | 15.91 | 0.75 | 229 |
| 60 | 21.08 | 0.64 | 260 |
| 70 | 27.53 | 0.51 | 270 |
| 80 | 35.56 | 0.36 | 246 |
| 90 | 45.63 | 0.19 | 167 |

Figure 3:
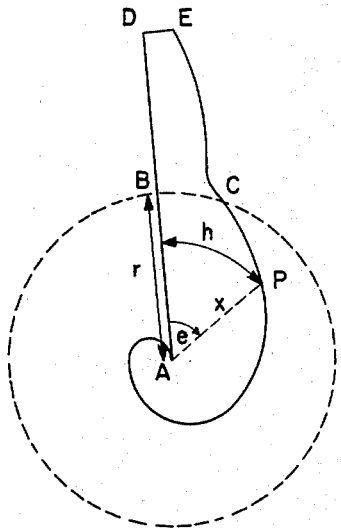
Figure 4:
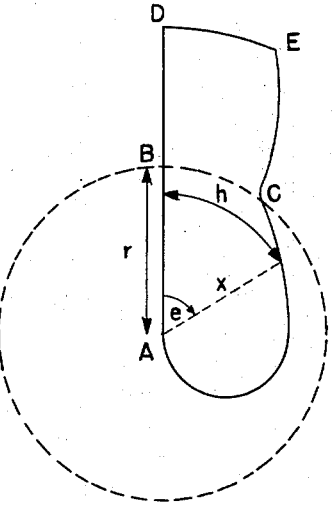
Figure 5:
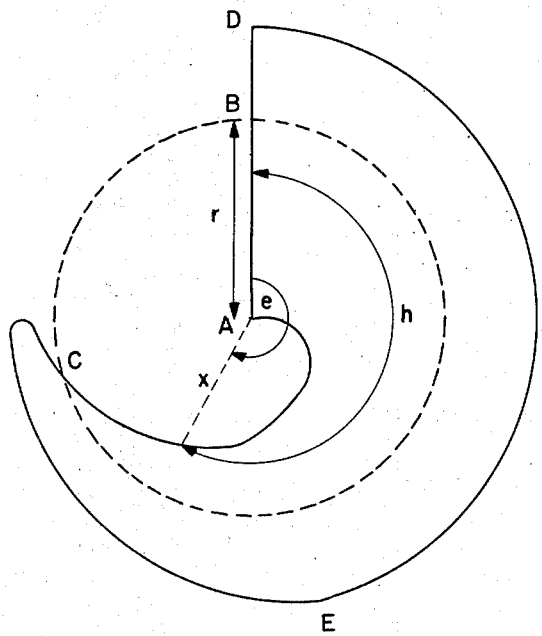

Suitable transparent or removed sectors of the screens of the preferred apparatus for use in the process of the present invention are further illustrated by means of Figures 3, 4 and 5, Figure 3 illustrating the sector set out in Table I, Figure 4 illustrating the sector set out in Table II, and Figure 5 illustrating the sector set out in Table III. In the said Figures 3, 4 and 5, ABC indicate the desired aperture for controlling the amount of light falling onto the mould, BCED being that part of the aperture designed to allow polymerisation of the flash, $r$ is the semi-diameter of the element to be made, $h$ is the arc width of the aperture at radial distance $x$ from the centre A, and $\theta$ is the angle made with a fixed radius AB by the radius sector from the point (P) on the edge of the aperture where the radial distance is $x$ from the centre.

The following illustrative examples of actual operations in accordance with the present invention, are given to provide a more complete understanding of these new procedures. In these examples, all parts are by weight unless otherwise specified.

EXAMPLE I

*Liquid polymerisable composition used*

10 parts of disintegrated polymethyl methacrylate and 100 parts of methyl methacrylate monomer are placed in a round bottomed flask fitted with a stirrer and supported in a water bath. The temperature of the water is raised to 80° C. and the stirrer started. When all the polymethyl methacrylate is dissolved in the methyl methacrylate monomer the hot water in the bath is replaced by cold water, the reaction mixture allowed to cool to room temperature and 0.1 part of benzoin is added to the reaction mixture. Stirring is continued until all the benzoin has dissolved.

*Mould used*

Two identical moulds, 250 mm. diameter, 25 mm. thick, and having a centrally placed concave portion of 101.6 mm. diameter and spherical curvature for which the radius was 254 mm., were machined, ground, and polished from plate glass.

*Process*

These two moulds are now assembled together with the concave portions facing one another and a rubber tubing gasket of outside diameter .350″ running round the circumference of the mould. The cell is held together by G-clamps. These clamps are tightened so that the distance between the two moulds at the edge is that required to give the necessary thickness of the lens to be cast. This distance was determined by trial and error so that the finished element was 2.54 mm. thick at its edge.

The gasket is now cut at one point and the two ends of the gasket pulled out slightly in order to allow a suitable pouring hole. The syrup described above, which has subsequently been freed from dissolved air by subjecting it to a pressure of approximately 5 cm. of mercury for about an hour, is then poured through this hole until the cell is filled. The two protruding ends of the gasket are then replaced carefully such that a good seal is made and the cell is placed on a turntable which rotates at the rate of 1 R. P. M.

The metal aperture screen illustrated in Figure 3 and set out in more detail in Table I is then placed ¼" above the top of the cell so that the centre of the screen is directly above the centre of the cell. 6 ft. above the cell is placed a 125 watt "Mercra" (registered trade mark) MB type mercury vapour lamp with the arc tube vertical. This lamp is then switched on, giving a substantially parallel beam of light in the direction of the cell on the turntable. The cell is left in this position, rotating on the turntable, until all the syrup in the cell has polymerised to hardness.

The cell is then transferred to an oven, the temperature of the oven raised to 130° C., and the cell allowed to remain there for 24 hours. The oven is then turned off and the cell, remaining in the oven, is allowed to cool to room temperature very gradually. When the cell is taken from the oven the plastic lens will probably have stripped automatically from the glass moulds. If it has not, it can be made to do so by applying slight leverage at the edge.

The resulting bi-convex lens has two spherical surfaces which accurately reproduce the spherical surfaces of the moulds against which the lens was cast.

EXAMPLE II

The liquid polymerisable composition described in Example I was prepared. The mould used had casting surfaces consisting of (1) an optical flat 220 mm. diameter obtained by grinding and polishing a sheet of plate glass 25 mm. thick and (2) a convex surface, 220 mm. diameter and 120 mm. radius of curvature, machined, ground and polished from another 25 mm. thick sheet of plate glass. The casting surfaces of the mould were assembled, the mould was filled with the liquid polymerisable composition and this composition was polymerised by irradiation and baking steps identical to the steps set out for the process in Example I, except that the G-clamps were adjusted so that the thickness of the centre of the finished element was 5 mm. and the metal aperture screen used was that illustrated in Figure 5 and set out in more detail in Table 3.

It is to be understood that the term light throughout this specification means all light from the infra red to the ultra violet inclusive. It will be appreciated that, as in the case with all light activated reactions, photopolymerisable monomeric compounds are polymerised only by light rays which they absorb or, if in the presence of a light activated polymerisation catalyst, by rays which are absorbed by the catalyst. A convenient wavelength band is that between 1,800 A.—the limit of transmission of a quartz tube in a mercury arc vapour lamp—and 7,000 A., the lower limit for the infra red. The preferred wavelengths are those shorter than 7,000 A. Although wavelengths below 3,200 A. are effective, 3,200 A. is the lower limit of transmission of plate glass and, since light passing through this material is frequently used in this process, 3,200 A. represents a lower preferred limit.

The process of our invention has been found particularly useful in the production of convex lenses and convex surface metallised mirrors. Our invention is, however, not restricted in this respect and the process may be applied to concave, concave/convex and aspherical optical elements, e. g. Schmidt corrector plates.

As is normal practice in light polymerisation processes, we find that it is usually necessary to subject the solid material in the mould, after the photopolymerisation step of this invention, to a heat treatment prior to removing it from the mould, in order that the polymerisable material remaining in the solid polymerised material may be polymerised and that the final article may have a sufficiently high softening point and that the article will strip satisfactorily from the mould.

It will be appreciated that after the polymerised material is removed from the mould the polymerised material around the edge of the optical element must often be removed because this material will have been used as a reservoir for supplying polymerisable material to the element and will normally have been polymerised to the solid state without control to prevent the formation of strains. This material around the edge of the mould is usually referred to as "flash." It is desirable to ensure that this flash is adequately polymerised during the casting operation. In computing the shape of the hereinbefore mentioned sector which characterises the screen, it is usually desirable, therefore, to treat at least that portion of the flash immediately adjacent to the optical component as being part of the optical component when deciding upon the shape of the sector. This will be more clearly appreciated by reference to the diagrams accompanying the present specification.

As an alternative to the use of the preferred apparatus itself in the process of this invention, a light screen or filter may be prepared by substituting a photographic plate for the mould in this apparatus where parallel light is used and exposing this plate to the light source while there is continuous relative rotary movement of the plate and the screen. If non-parallel light is used, the photographic plate should, of course, be placed for this operation in the position in which the finished screen or filter will be placed relative to the light source and the mould in the casting of optical elements. The plate is then developed and fixed and a "negative" of a screen suitable for use in the process of this invention, that is, suitable for replacing the screen used in the production of the "negative," is thereby obtained. From this "negative" any number of "positive" screens may be obtained. These "positive" screens may be used advantageously in the process of the present invention since relative movement between these screens and the moulds is, of course, unnecessary, the screen simply being positioned between the light source and the mould so that the axes of the screen and mould are coincident. The "positive" screen may be prepared directly by positioning a photographic plate as described above and using a screen in which those parts which would normally be required to be opaque are transparent and those normally transparent are opaque, exposing the plate to the light source while there is continuous even relative rotary movement of the plate and the screen, and developing and fixing the photographic plate.

Other suitable screens for use in the process of the present invention include those formed by shaped plates of light absorbing material or of pigmented transparent material, the thickness of these plates being graduated to give a light transmission as set out, and those formed by immersing a transparent plate having the appropriate shape in a layer of uniform depth of a light-absorbing liquid.

Monomeric compounds which may be employed in the process of the present invention include acrylic and substituted acrylic acids and esters, for example, acrylic and methacrylic acids, methyl, ethyl, isopropyl, cyclohexyl, tetrahydrofurfuryl, phenyl, phenyl Cellosolve and 2,2,2-trifluoroethyl methacrylates, and esters of alpha-fluoroacrylic acid and fluorinated alcohols; styrene, vinyl esters such as vinyl acetate; and compounds containing more than one $>C=C<$ group, such as allyl methacrylate and diallyl fumarate. Mixtures of two or more of these compounds may also be used. The preferred compound is methyl methacrylate.

The composition which is to be cast according to the present process can be in any liquid form. Preferably it is employed in the form of a syrup. This can be prepared by the partial polymerisation of the polmerisable constituent or constituents of the composition before its introduction into the mould or by dissolving a polymeric material in the monomeric constituent or constituents. If desired the two methods can be employed in combination.

The syrup should preferably be submitted to a vacuum treatment before use in order to remove dissolved gases and bubbles, for example, by subjecting it in a cylinder having a height not greater than its diameter to a vacuum of less than 10 centimetres of mercury pressure for one hour. The syrup should also have a viscosity of less than 700 poises at 20° C. or it will not pour satisfactorily and air bubbles tend to become trapped in it.

When working with a syrup consisting essentially of polymethyl methacrylate dissolved in methyl methacrylate monomer, the syrup preferably contains at least 25% by weight of polymer. When polystyrene is used, the syrup preferably contains not less than 40% by weight of polymer.

The syrups may be prepared by dissolving a polymer in a monomer or by heating and/or subjecting to light one or more monomers until the desired amount of polymer has been produced in situ. It is generally desirable that the syrup of the polymer dissolved in monomer contains a polymer of low molecular weight so that a fairly high concentration of polymer can be achieved without producing a syrup of undesirably high viscosity. For example, when using polymethyl methacrylate the preferred molecular weight range is that which corresponds to a specific viscosity of 0.015–0.075 for a solution of 1 gm. of the polymer in 1 litre of chloroform at 20° C. Such low molecular weight polymers may be obtained in a variety of ways, for example, by malaxating polymers of higher molecular weight on hot rolls or by polymerising the corresponding monomer in the presence of large amounts of catalyst, such as benzoyl peroxide, or in the presence of a chain ending compound such as turpentine. Syrups of low molecular weight polymer in monomer may also be obtained by partially polymerising methyl methacrylate by means of light when it contains about 0.5% by weight of light activated polymerisation catalyst.

Preferably the photopolymerisation is conducted in the presence of a photopolymerisation catalyst. One group of photopolymerisation catalysts which may be employed consists of the alpha-carbonyl alcohols of the formula $$RCO—CHOH—R^1,$$

wherein R and $R^1$ are the same or different and are hydrogen atoms or monovalent hydrocarbon radicals. A sub-class falling under this generic classification are the acyloins, which are organic compounds of the above type, wherein R and $R^1$ are aliphatic or aromatic hydrocarbon radicals and which are formed from two molecules of an aldehyde by interreaction of the aldehyde groups. Illustrative of these compounds are glycollic aldehyde, benzoin, acetoin, butyroin, 3-hydroxy-4-methyl-pentanone-2, toluin, tert-butylbenzoin, 12-hydroxy-13-ketotetracosane, and O- and p-tert-butyltoluin. Of these, benzoin is the preferred specified compound. Hydrocarbon radicals bearing constituent atoms or radicals, e. g. halogen, sulpho, carbonyl, alkoxy and acyloxy groups, are for the purposes of this invention equivalent to hydrocarbon radicals in the photopolymerisation catalysts employed herein.

A second group is that of acyloin ethers of the formula—

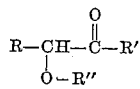

wherein R, R' and R'' are monovalent hydrocarbon radicals. Examples of compounds of this group include benzoin methyl ether, benzoin ethyl ether, benzoin propyl ether, pivaloin ethyl ether and anisoin methyl ether. Of these compounds, benzoin ethyl ether is preferred.

A third group of photopolymerisation catalysts which may be employed is that of adjacent polyketaldonyl compounds, which are compounds of the formula $R—(CO)_x—R^1$, wherein $x$ is an integer of two or three, preferably two, and R and $R^1$ are hydrogen or monovalent aliphatic or aromatic hydrocarbon radicals. Illustrative polyketaldonyl compounds are: diacetyl, pentanedione-2,3; octanedione-2,3; 1-phenylbutanedione-1,2; benzil, 2,2-dimethyl-4-phenylbutanedione-3,4; glyoxal; phenyl-glyoxal; diphenyl triketone and 1,2,cyclohexanedione. Of these, diacetyl is the preferred compound.

The concentration of photopolymerisation catalyst in the monomer is of importance because it appreciably affects the rate of polymerisation. From 0.01% to 1.0% of the photopolymerisation catalysts described above, by weight of the photopolymerisable compound, may be employed, with 0.02% to 0.25% preferred. When less than this amount of the photopolymerisation catalyst is employed the reaction proceeds more slowly and when greater amounts than this are used discoloration is apt to occur. Usually about 0.1% of an acyloin or diketone is employed, although either more or less can be used depending on the rate of polymerisation desired. Furthermore, these photopolymerisation catalysts need not be employed alone but can be used in conjunction with an organic peroxide. This has the advantage that if the monomer is only partially polymerised when irradiation is discontinued it will continue to polymerise at a fairly rapid rate and finally reach completion if the temperature is sufficiently high. Although benzoyl peroxide is the preferred peroxide for use, any organic solvent soluble peroxide may be used, for example, lauryl peroxide, acetyl peroxide, butyrol peroxide, succinyl peroxide and ascoridole. In general, from 0.1% to 0.2% of peroxide, by weight of the photopolymerisable material, is preferred. Peroxides are not necessary in this reaction provided the exposure to light is long enough.

Instead of using one of the photopolymerisation catalysts described above, in the presence or absence of a peroxide, the polymerisation may be carried out in the presence of an organic azo compound in which the valencies of the azo group are attached to different non-aromatic carbon atoms. This method of operating the process of this invention is generally preferred because these azo catalysts are very stable to oxidation, causing no discoloration of the products. The preferred azo compounds are those in which at least one and preferably both of the valencies of the azo group are satisfied by tertiary carbon atoms which are bonded to a negative substituent. Moreover, this substituent is preferably a neutral monovalent group, that is, a non-acidic and non-basic monovalent group, the three remaining valencies of which are satisfied by nitrogen or oxygen atoms. Examples of such groups are the nitrile, carbalkoxy and carbonamide groups.

Examples of the preferred compounds for use in the process of this invention are alpha,alpha'-azodiisobutyronitrile; alpha,alpha'-azobis(alpha-gamma-dimethyl-valeronitrile); dimethyl and diethyl alpha, alpha'-azodiisobutyrates; alpha, alpha'-azobis(alpha-ethylbutyronitrile); alpha, alpha'-azobis(alpha-ethylbutyronitrile) and alpha alpha'-azodiisobutyrocarbonamide.

It is preferred to use from 0.0005% to 0.5% of the azo catalyst, by weight of the monomeric compound or partial polymer.

We claim:

1. A process for the manufacture of cast synthetic resinous structures which have high dimensional precision constituting a solid of revolution which comprises confining a liquid photopolymerizable composition comprising a photopolymerizable monomeric compound possessing at least one $>C=C<$ group in the molecule in a mold having internal surfaces defining said solid of revolution, irradiating said photopolymerizable composition with light from an external source substantially parallel to the axis of revolution of said solid of revolution so that the average quantity of light per unit thickness of photopolymerizable composition measured in the direction of the incident light, said thickness being the average value of the thickness so measured, falling per unit time upon a unit area of said polymerizable composition, decreases exponentially from the said axis of revolution up to the outer edge of the optical element, and continuing the irradiation as specified until a solid body is formed from said composition.

2. A process for the manufacture of cast synthetic resinous structures which have high dimensional precision constituting a solid of revolution which comprises confining a liquid photopolymerizable composition comprising a photopolymerizable monomeric compound possessing at least one $>C=C<$ group in the molecule in a mould having external surfaces defining said solid of revolution, irradiating said photopolymerizable composition with light from an external source substantially parallel to the axis of said solid of revolution in a quantity so that $$\frac{d}{dx}\left(\frac{Q}{t}\right)$$

is negative for all values of $x$ throughout the range $x=o$ to $x=r$, and $$\frac{d^2}{dx^2}\left(\frac{Q}{t}\right)$$

is not equal to zero throughout this range, wherein Q is the average quantity of light per unit time falling on a unit area of said photopolymerizable composition, $t$ is the average value of the thickness of the photopolymerizable composition measured in the direction of the incident light, $x$ is the distance from the axis of revolution measured in the center of the element and $r$ is the radius of the element, and continuing the irradiation as specified until a solid body is formed from said composition.

3. A process as claimed in claim 2, wherein the average intensity of the incident light varies across the irradiated surface of said photopolymerizable composition according to the equation:

$$\frac{Q}{t}=kt_x(1-Ax^2)$$

where Q, $t$ and $x$ have the significance stated in claim 2, $t_x$ is the average value of the thickness of the photopolymerizable composition, measured in the direction of the incident light, at a distance $x$ from the axis of revolution, and $k$ and A are arbitrary constants greater than zero.

4. A process for the manufacture of cast synthetic resinous optical elements which have high dimensional precision constituting a solid of revolution which comprises confining a liquid photopolymerizable composition comprising a methacrylic acid ester in a mould having internal surfaces defining said solid of revolution, irradiating said photopolymerizable composition with light from an external source parallel to the axis of revolution of said solid of revolution so that the average quantity of light per unit thickness of photopolymerizable composition measured in the direction of the incident light, said thickness being the average value of the thickness so measured, falling uer unit time upon a unit area of said polymerizable composition, decreases exponentially from the said axis of revolution up to the outer edge oft he optical element, and continuing the irradiation as specified until a solid body is formed from said composition.

5. The process as claimed in claim 2, wherein the quantity of light per unit thickness decreases as the distance from the axis of revolution increases up to the outer edge of the polymerizing mass.

6. The process as claimed in claim 2, wherein the decrease in the quantity of light per unit thickness is such that the quantity of light per unit thickness at the edge of the optical element is not less than one twentieth of its value at the axis of reference.

JOHN GADSBY.
ALAN LESLIE LAWS TOMPSETT.

REFERENCES CITED

The following references are of record in the file of this patent:

UNITED STATES PATENTS

| Number | Name | Date |
|---|---|---|
| 2,193,742 | Rohm et al. | Mar. 12, 1940 |
| 2,367,660 | Agre | Jan. 25, 1945 |
| 2,367,661 | Agre | Jan. 25, 1945 |
| 2,425,666 | Barnes | Aug. 12, 1947 |
| 2,480,749 | Marks | Aug. 30, 1949 |
| 2,480,751 | Marks | Aug. 30, 1949 |